(12) United States Patent  
Rowe

(10) Patent No.: US 6,740,989 B2
(45) Date of Patent: May 25, 2004

(54) VERTICAL AXIS WIND TURBINE

(75) Inventor: John Rowe, Whitby (CA)

(73) Assignee: Pacifex Management Inc., Ontario (CA)

( * ) Notice: Subject to any disclaimer, the term of this patent is extended or adjusted under 35 U.S.C. 154(b) by 86 days.

(21) Appl. No.: 10/224,463

(22) Filed: Aug. 21, 2002

(65) Prior Publication Data

US 2004/0036297 A1 Feb. 26, 2004

(51) Int. Cl.⁷ ................................................. F03D 3/04
(52) U.S. Cl. ........................ 290/55; 290/44; 415/4.2; 415/4.4
(58) Field of Search ............................. 290/43, 44, 54, 290/55; 415/4.2, 4.4

(56) References Cited

U.S. PATENT DOCUMENTS

| | | | |
|---|---|---|---|
| 1,578,835 A | | 3/1926 | Kothe |
| 4,039,849 A | * | 8/1977 | Mater et al. ................. 290/55 |
| 4,551,631 A | * | 11/1985 | Trigilio ...................... 290/55 |
| 4,684,817 A | | 8/1987 | Goldwater |
| 4,686,376 A | * | 8/1987 | Retz ........................... 290/42 |
| 5,044,878 A | | 9/1991 | Wilhelm |
| 5,336,933 A | | 8/1994 | Ernster |
| 5,391,926 A | | 2/1995 | Staley et al. |
| 5,664,418 A | * | 9/1997 | Walters ........................ 60/398 |
| 5,852,331 A | | 12/1998 | Giorgini |
| 6,015,258 A | | 1/2000 | Taylor |
| 6,109,863 A | | 8/2000 | Milliken |
| 6,191,496 B1 | * | 2/2001 | Elder ........................... 290/55 |
| 6,465,899 B2 | * | 10/2002 | Roberts ........................ 290/44 |
| 2002/0047276 A1 | | 4/2002 | Elder |

* cited by examiner

Primary Examiner—Nicholas Ponomarenko
(74) Attorney, Agent, or Firm—Oglivy Renault; Paul J. Field

(57) ABSTRACT

A vertical axis wind turbine with a turbine rotor with rotor blades disposed for rotation about a substantially vertical axis. The turbine includes multiple vertically extending stator vanes circumferentially spaced apart about the rotor in an annular array. Each vane has a radially inward facing surface, a radially outward facing surface and a flange on an outer edge of each vane. The flange serves to create a turbulent swirling boundary layer on the vane surfaces that rotates in a direction that draws and redirects air flow into the air flow channels defined by the stator vanes that is then compressed by the narrowing of the channels and directed to the rotor blades to drive the turbine.

14 Claims, 7 Drawing Sheets

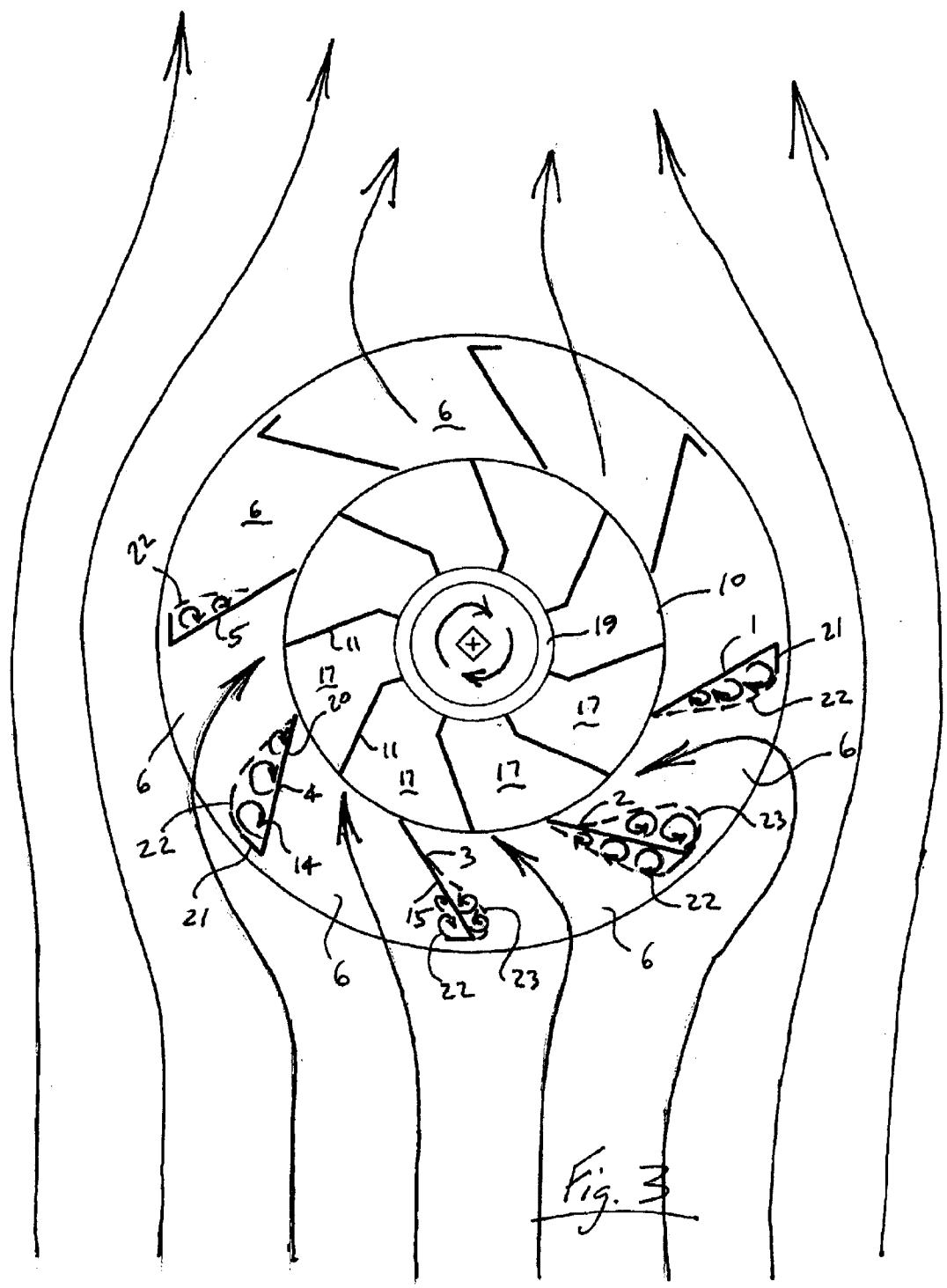

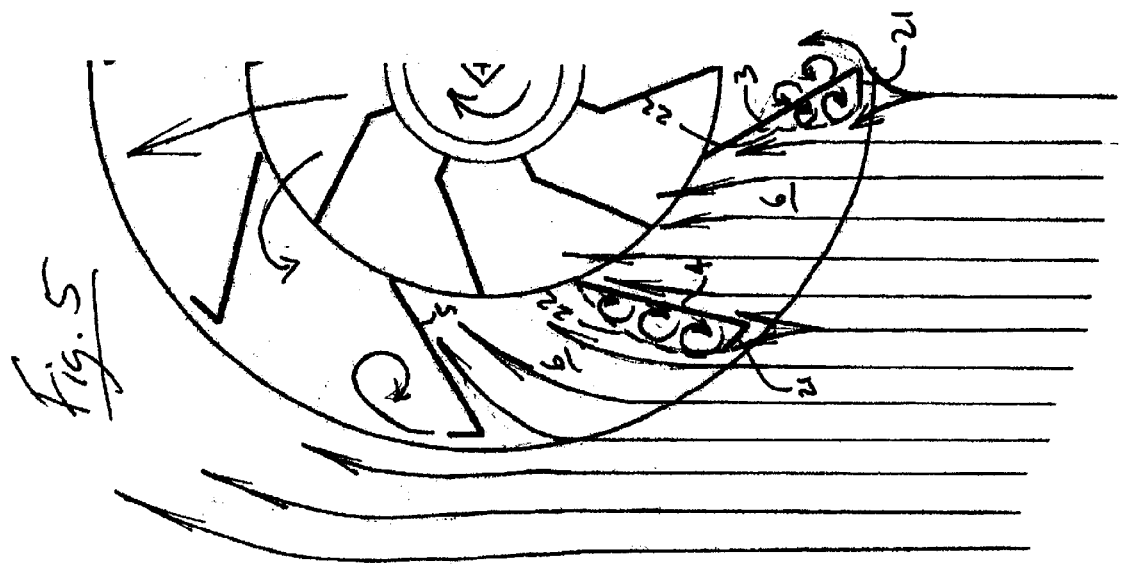
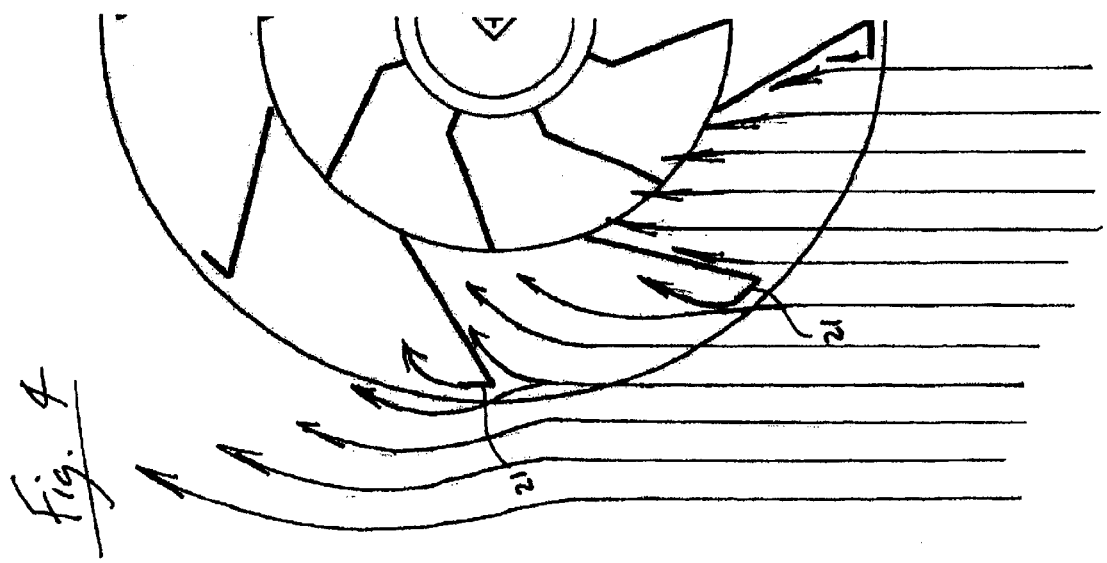

VERTICAL AXIS WIND TURBINE

TECHNICAL FIELD

The invention relates to a vertical axis wind turbine with an annular array of stator vanes to direct wind into the rotor, where each vane has an outer edge flange to create a turbulent swirling boundary layer adjacent to the vane surfaces that rotates in a direction that draws and redirects air flow into the air flow channels defined by the stator vanes.

BACKGROUND OF THE ART

Wind is used as a source of energy for driving horizontal axis and vertical axis windmills. Horizontal axis windmills have been used extensively to drive electrical generators however they suffer from several disadvantages, including danger to birds and air traffic, obscuring the landscape with banks of rotating windmills, and in the case of large diameter horizontal axis propellers, supersonic speeds at the tips of the rotors.

Vertical axis wind turbines have been provided in the prior art with a central rotor surrounded by stationary ring of vanes that serve to direct and compress air from the wind before is directed at the rotor blades. A disadvantage of a horizontal axis windmill is that it must turn to face the wind direction whereas the exposure of a vertical axis windmill or turbine wind remains constant regardless of the wind direction.

example of vertical axis wind turbine is shown in U.S. Pat. No. 5,391,926 to Staley et al. that uses double curved stator blades to direct wind current to the rotor assembly and to increase structure stability of the thin stator blades.

Further example of a vertical axis rotor within a ring blades is shown in U.S. Pat. No. 5,852,331 to Giorgini. In this case, the stator blades are disposed in a helical pattern however significant shielding of the airflow is anticipated reducing the energy captured by this type of stator arrangement.

U.S. Pat. No. 6,015,258 to Taylor discloses another wind turbine that includes a ring of stator blades of an airfoil shape to reduce impedance of air directed towards the central rotor assembly.

Further, U.S. Patent Application Publication No. US2002/0047276 A1 discloses an outer ring of planar stator blades to direct flow of wind into a central rotor assembly.

A disadvantage of all the vertical axis windmills of the prior art relates to the inability to capture wind from the entire exposed surface of the stator assembly. The disposition of the stators themselves shield a portion of the exposed surface of the stator from the wind and directing the wind to the central rotor assembly. In general, the exterior of the stator is usually cylindrical Ideally, the entire one half cylindrical surface that is exposed to wind should be able to capture wind and direct wind into a swirling flow of partially compressed air towards the central rotor assembly. Unfortunately, in most cases the prior art enables capture of only a portion of the entire semi-cylindrical surface area thereby requiring larger turbine units to capture more energy from the wind exposure.

It is an object of the present invention to provide a vertical axis wind turbine which enables capture of wind energy from a larger portion of the exposed surface of the stator assembly relative to the prior art.

It is a further object of the invention to provide a stator assembly which is structurally reinforced.

It is further object of the invention to provide a stator assembly which is simply constructed of inexpensive material.

Further objects of the invention will be apparent from review of the disclosure, drawings and description of the invention below.

DISCLOSURE OF THE INVENTION

The invention provides a vertical axis wind turbine with a turbine rotor with rotor blades disposed for rotation about a substantially vertical axis. The turbine includes multiple vertically extending stator vanes circumferentially spaced apart about the rotor in an annular array. Each vane has a radially inward facing surface, a radially outward facing surface and a flange on an outer edge of each vane. The flange serves to create a turbulent swirling boundary layer on the vane surfaces that rotates in a direction that draws and redirects air flow into the air flow channels defined by the stator vanes that is then compressed by the narrowing of the channels and directed to the rotor blades to drive the turbine.

DESCRIPTION OF THE DRAWINGS

In order that the invention may be readily understood, one embodiment of the invention is illustrated by way of example in the accompanying drawings.

Further details of the invention and its advantages will be apparent from the detailed description included below.

DETAILED DESCRIPTION OF PREFERRED EMBODIMENTS

Figure 1:
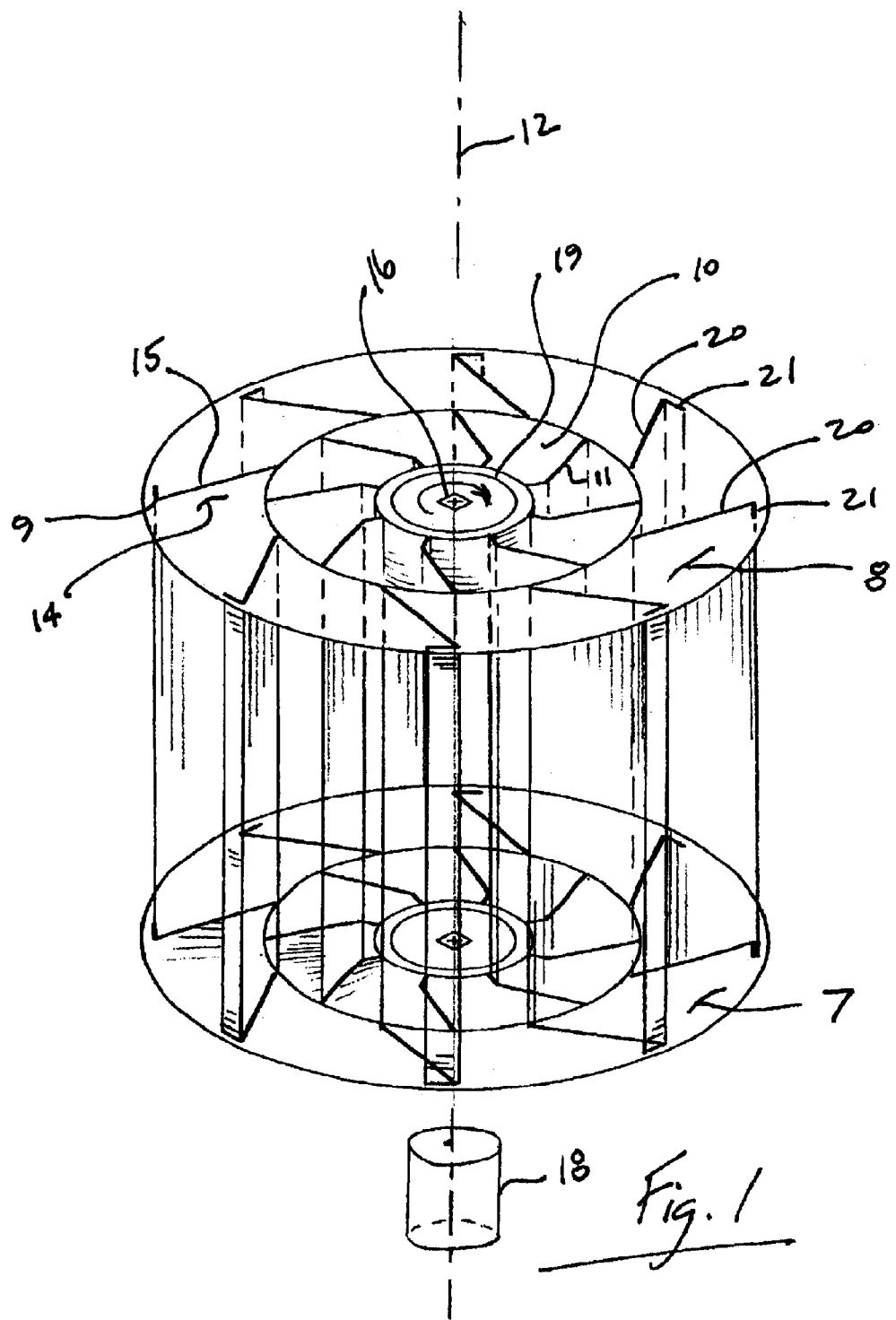
FIG. 1 is a perspective view of a vertical axis wind turbine with a central turbine rotor surrounded by an annular stator vane assembly.

FIG. 1 shows the general arrangement of a vertical axis wind turbine with turbine rotor 10 with rotor blades 11 abutting a rotor hub 19 and rotating in a clockwise direction as drawn about a substantially vertical axis 12. It will be understood of course that the orientation of the rotor blades 11 and stator vanes 20 may be reversed to drive the turbine rotor 10 in a counter clockwise direction if desired.

Figure 3:
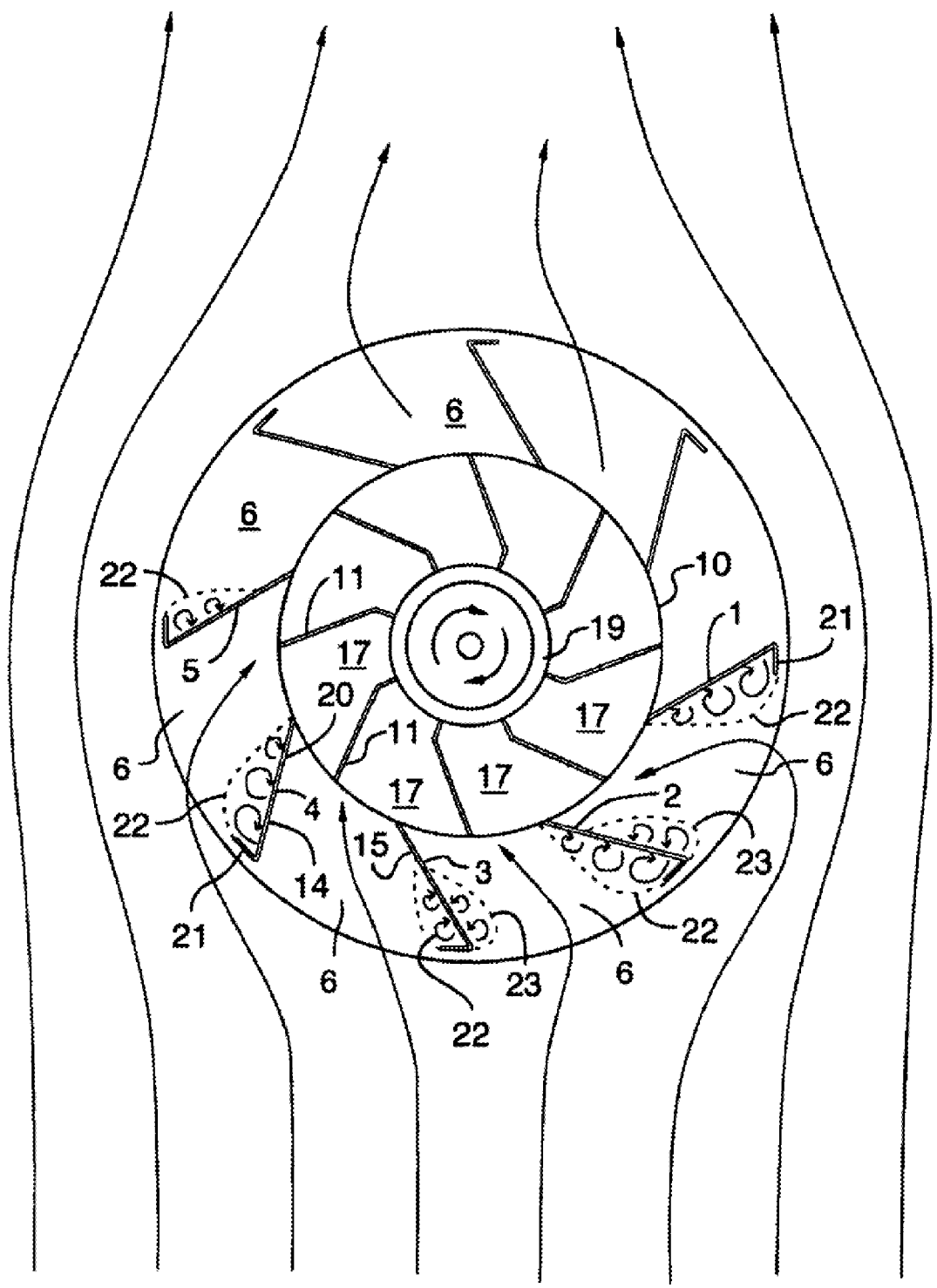
FIG. 3 is a horizontal sectional view showing wind currents created on the boundary surface layers of the stator vanes as a result of turbulent flow over the stator vanes and flanges.

Circumferentially spaced about the rotor 10 in an annular array are a plurality of vertically extending stator vanes 20. Each vane 20 has a radially inward facing surface 14 and a radially outward facing surface 15 with a flange 21 on the outer edge 9 of each vane 20. The vanes 20 extend vertically between a top plate 8 and a bottom plate 7 defining a plurality of airflow channels 6 (best seen in FIGS. 3 through 7) bounded by the inward facing surface 14 of a first vane 20 and the outward facing surface 15 of a second vane 20 adjacent to the first vane 20 and the top and bottom plates 8 and 7. In the embodiment shown the top and bottom plates 8 and 7 include rotor shaft mounting bearings 16 and the rotor shaft includes an electrical generator 18.

seen in FIG. 3, the rotor blades 11 have an inner edge abutting the rotor hub 19 thereby defining a plurality of air containment chambers 17. Due to the annular orientation of the rotor blades 11, the force of wind directed against the rotor blades 11 causes an imbalanced force about the axis 12 resulting in rotation of the rotor 10. In the embodiment shown the rotor blades 11 have a uniform horizontal cross-section throughout their vertical length and preferably are planar vertical surfaces resulting in simple construction and maintenance. However, rotor blades 11 may be formed in a helical surface (not shown) and other configurations are within the contemplation of the invention.

Figure 2:
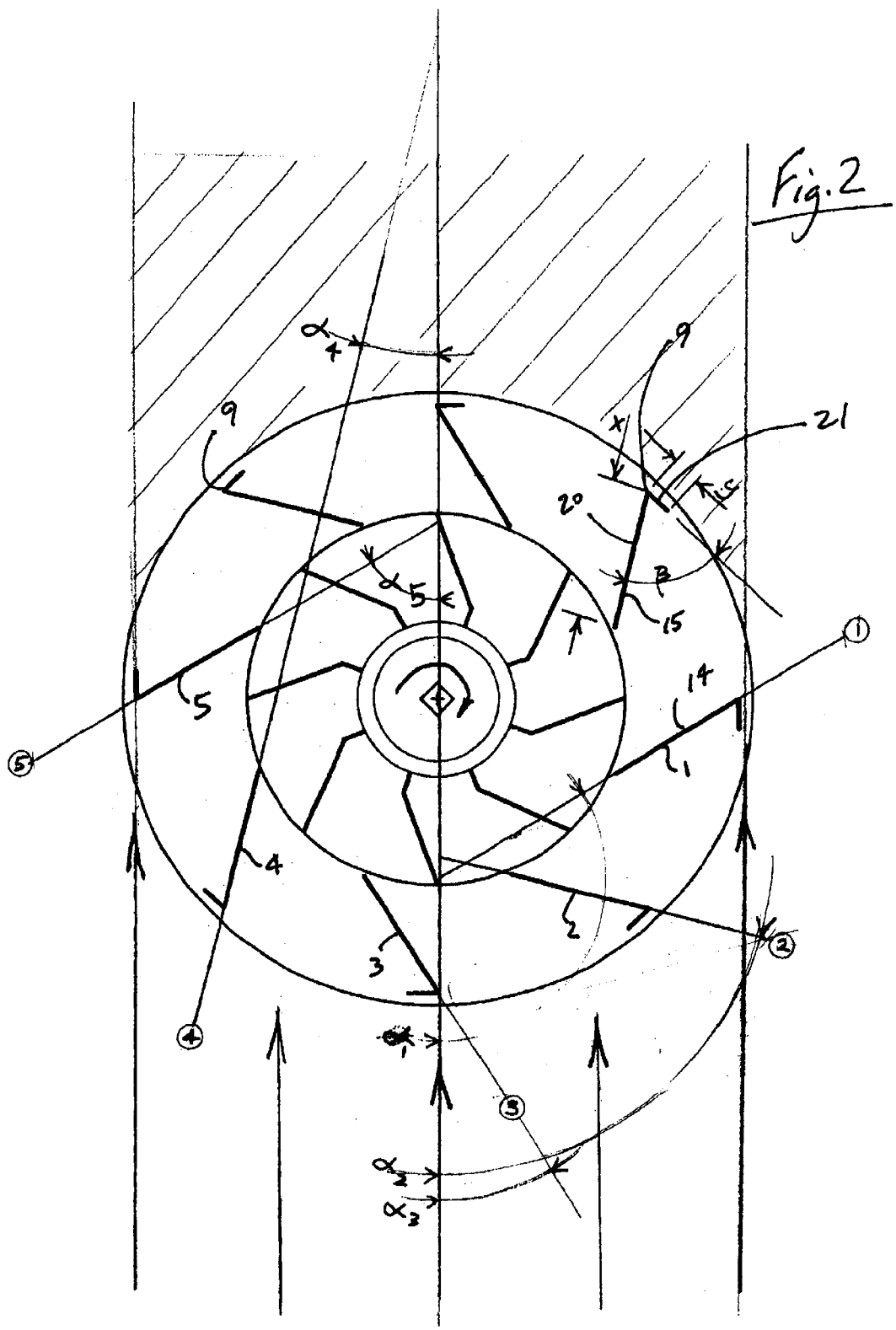
FIG. 2 is a horizontal sectional view through the vertical axis wind turbine with central turbine rotor and exterior ring of stator vanes with wind direction blowing from the bottom to top as drawn, thereby driving the rotor in a clockwise direction, in the example shown.

Referring to FIG. 2, the flange 21 is preferably disposed at an acute angle β to the outward-facing surface 15 of the vane 20. Preferably, the flange 21 is tangential to a circle circumscribed by points on a horizontal plane intersecting the outer edges 9 of the vanes 20 as shown in the example of the drawing. It will be understood however that the orientation of the flange 21 relative to the vane 20, the vane orientation and the relative shapes of the vane 20 and flange 21 components are subject to optimization depending on various parameters. It has been found however by experimentation that the relative size of the flange 21 and vane 20 has significant effect on the capturing of wind energy since the flange 21 has a tendency to shield wind if too large, and must be a minimum size to ensure creation of boundary layer vortex air flow as illustrated. In addition, various other shapes with aerodynamic profiles are possible. However, it has been found that a simple planar construction of vanes 20 and flanges 21 result in acceptable performance and provides the advantage of simple construction without requiring complex shapes and manufacturing procedures.

shown in the example of FIG. 2 therefore, preferably the vane 20 has a horizontal width x relative to the horizontal width y of the flange 21 in the ratio of 4:1 to 6:1. For simple construction and ease of manufacture, each vane 20 and flange 21 has a uniform horizontal cross-section throughout their vertical length which is preferably achieved through inward and outward facing surfaces 14 and 15 that are planar. The extremely simple construction provided in the example illustrated where inward and outward facing surfaces 14 and 15 of the vanes 20 and flanges 21 that are parallel such that construction using sheet metal or plywood is practical for example. Many prior art wind turbines are of complex geometric construction that place them out reach of underdeveloped countries, remote farms or home owners. As well, pre-fabrication and shipping to remote sites relies on simple construction and simple assembly instructions on site.

The functioning of the wind turbine will now be described in detail. FIG. 2 shows wind direction from the bottom of the drawing and toward the top of the drawing a shaded area represents the zone in which the turbine tends to block the wind flow. Progressing from right to left in a clockwise direction, vane 1 receives wind at angle $β_1$ which is an obtuse angle whereas vanes 2, 3, 4 and 5 receive wind and at angle $β_2$, $β_3$, $β_4$ and $β_5$ which are acute angles.

In FIG. 3 the interaction of the wind from the bottom of the drawing towards the top and the stator vane assembly indicates that vanes 2, 3, 4 and 5 readily receive wind direction with minimal redirection required whereas the wind flowing past vane 1 is redirected by turbulent swirling flow indicated by swirling boundary layer areas 22 and 23, as indicated by the arrows within the boundary layers 22 and 23. Swirling currents of air are created primarily by the flanges 21 and relatively sharp edges of the vanes creating a vacuum area downstream of a sharp edge. The vacuum created by flow over a sharp edge and the swirling turbulence created by the flow over the flange 21 serves to draw and redirect airflow into the airflow channels 6. In particular, the boundary layers 22 and 23 formed on surfaces of vane 1 and vane 2 redirect airflow by drawing airflow into the airflow channel 6 in the manner indicated in FIG. 3 and in detail in FIGS. 6 and 7.

Figure 5:
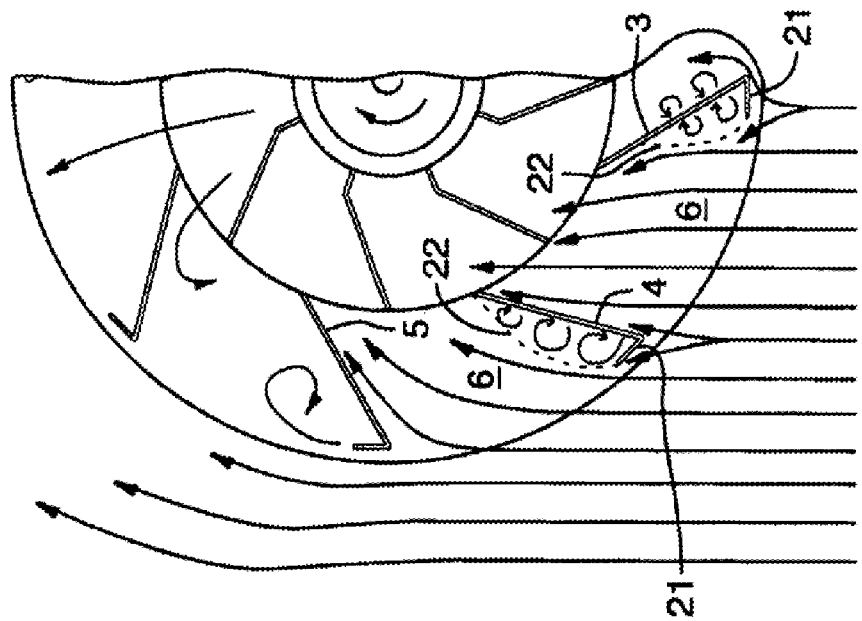
FIGS. 4 and 5 are progressive views of the formation of turbulent vortex areas on the surface of stator rings on the left side of the wind turbine.
Figure 4:
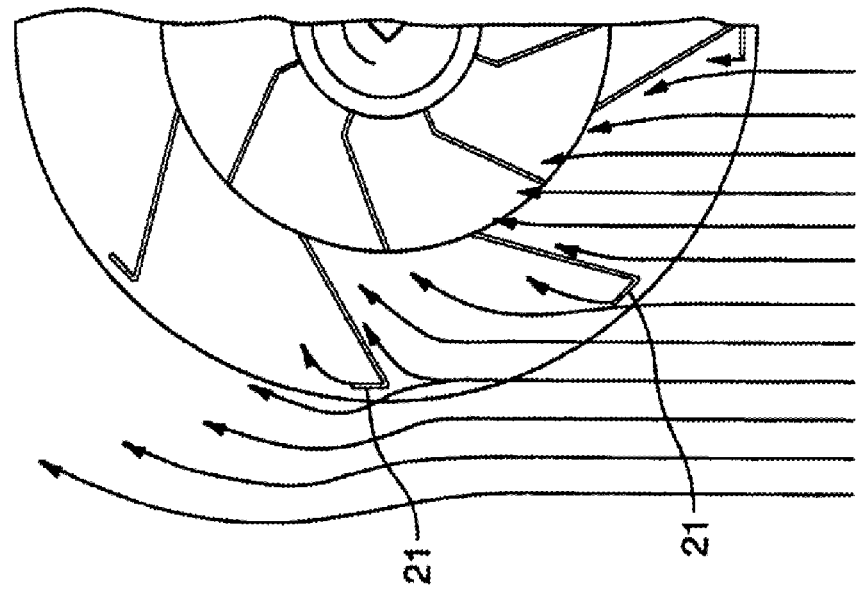
Figure 7:
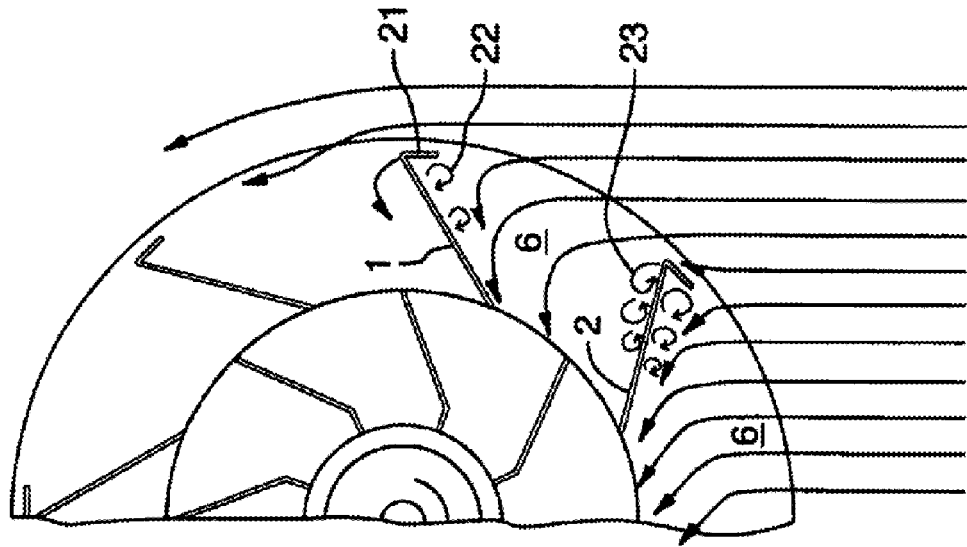
Figure 6:
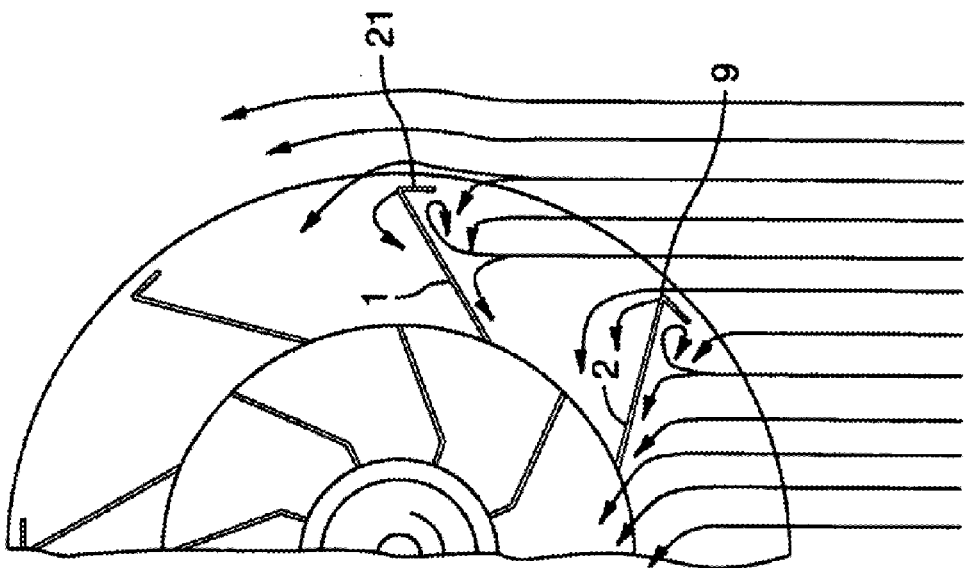
Figure 8:
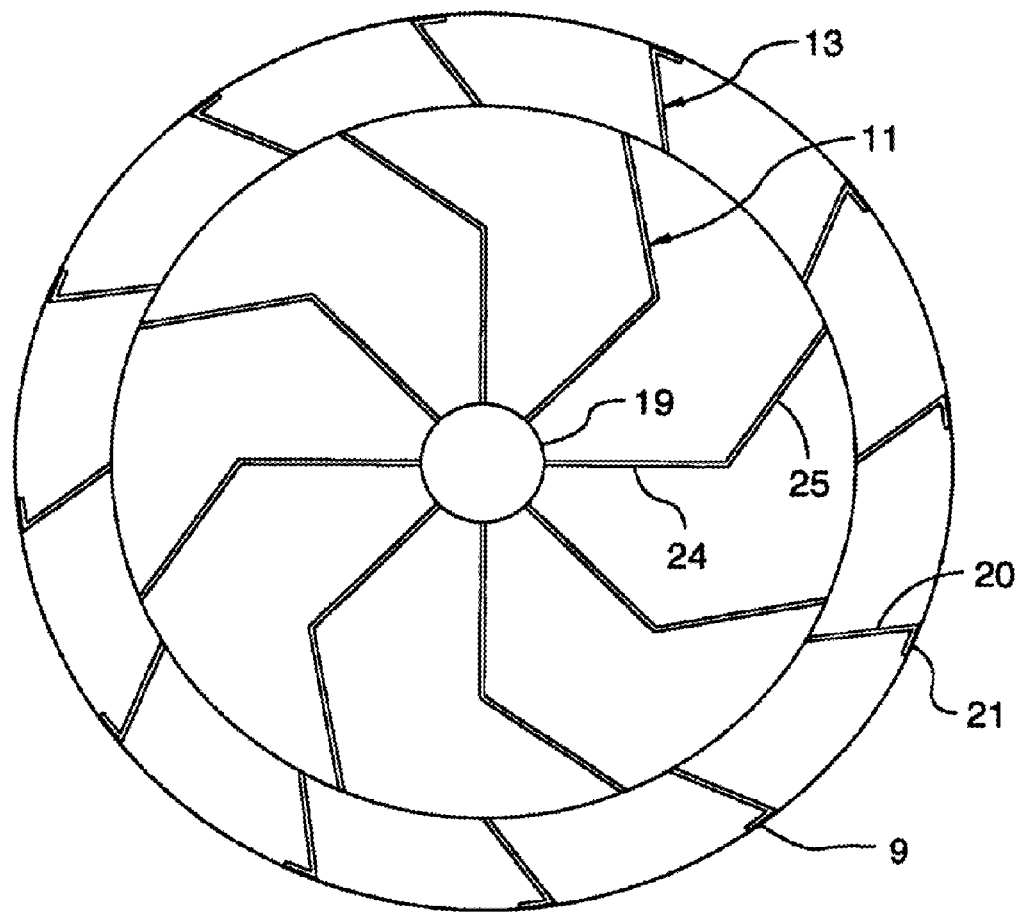
Figure 9:
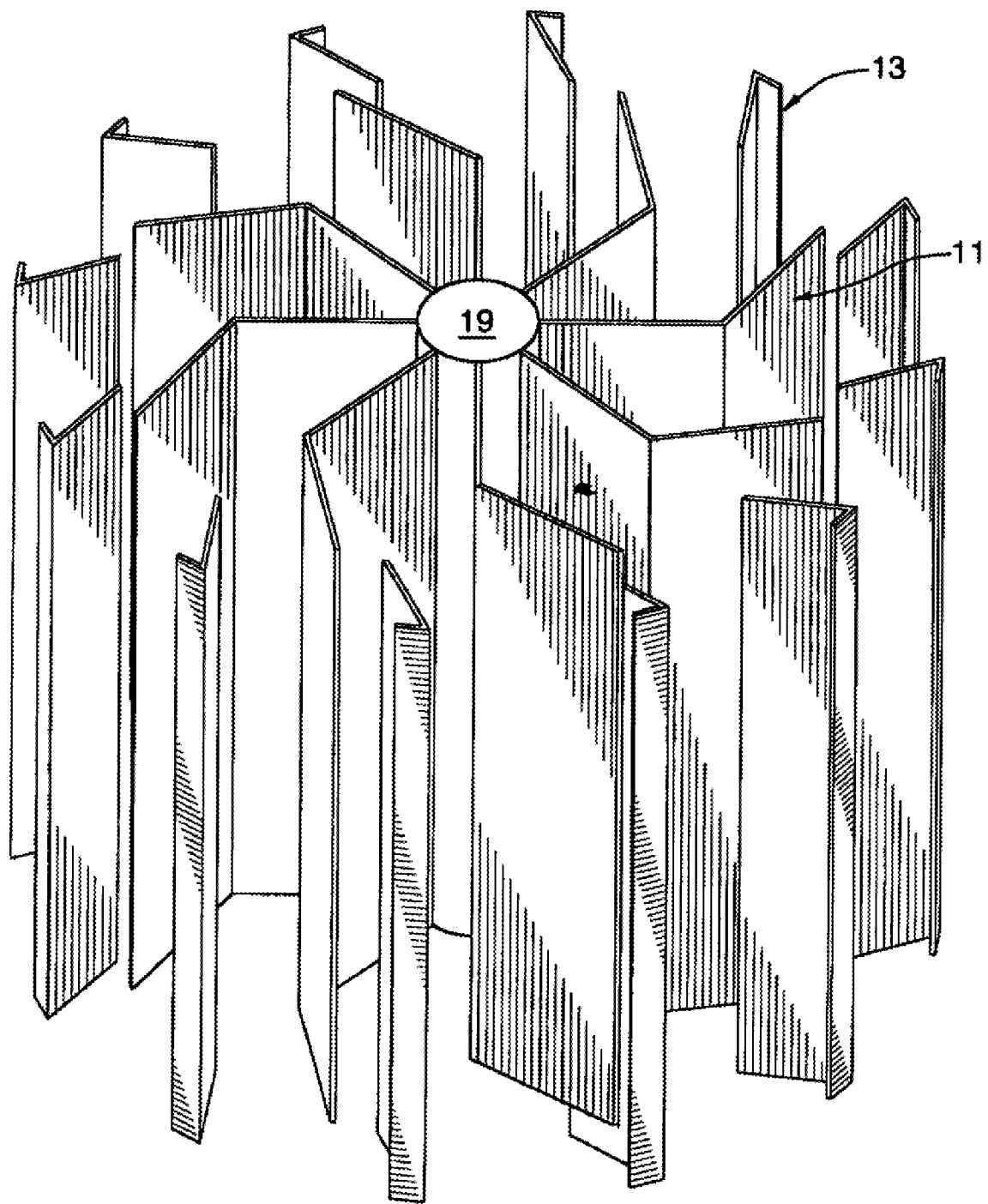
Figure 1:
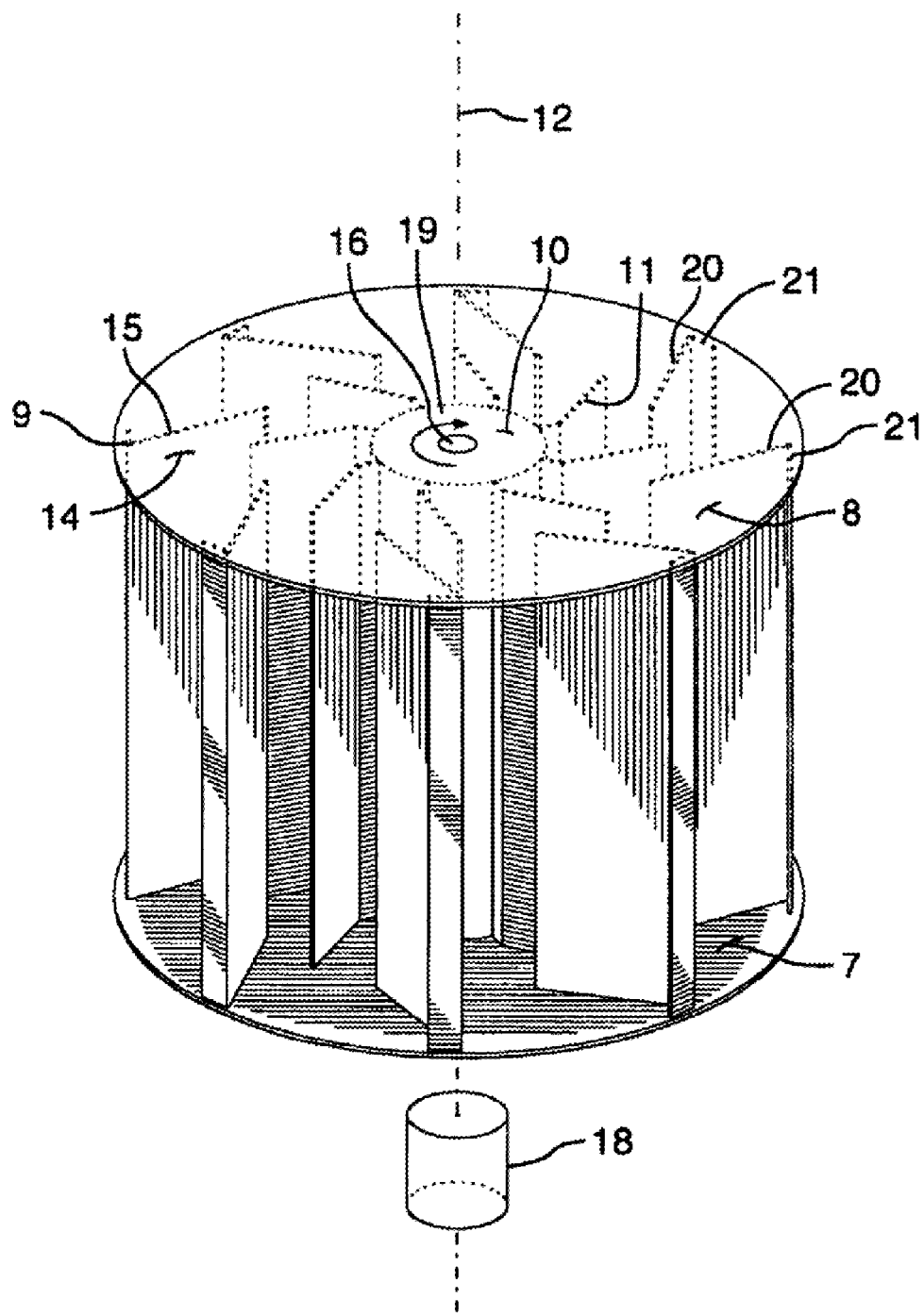
Figure 2:
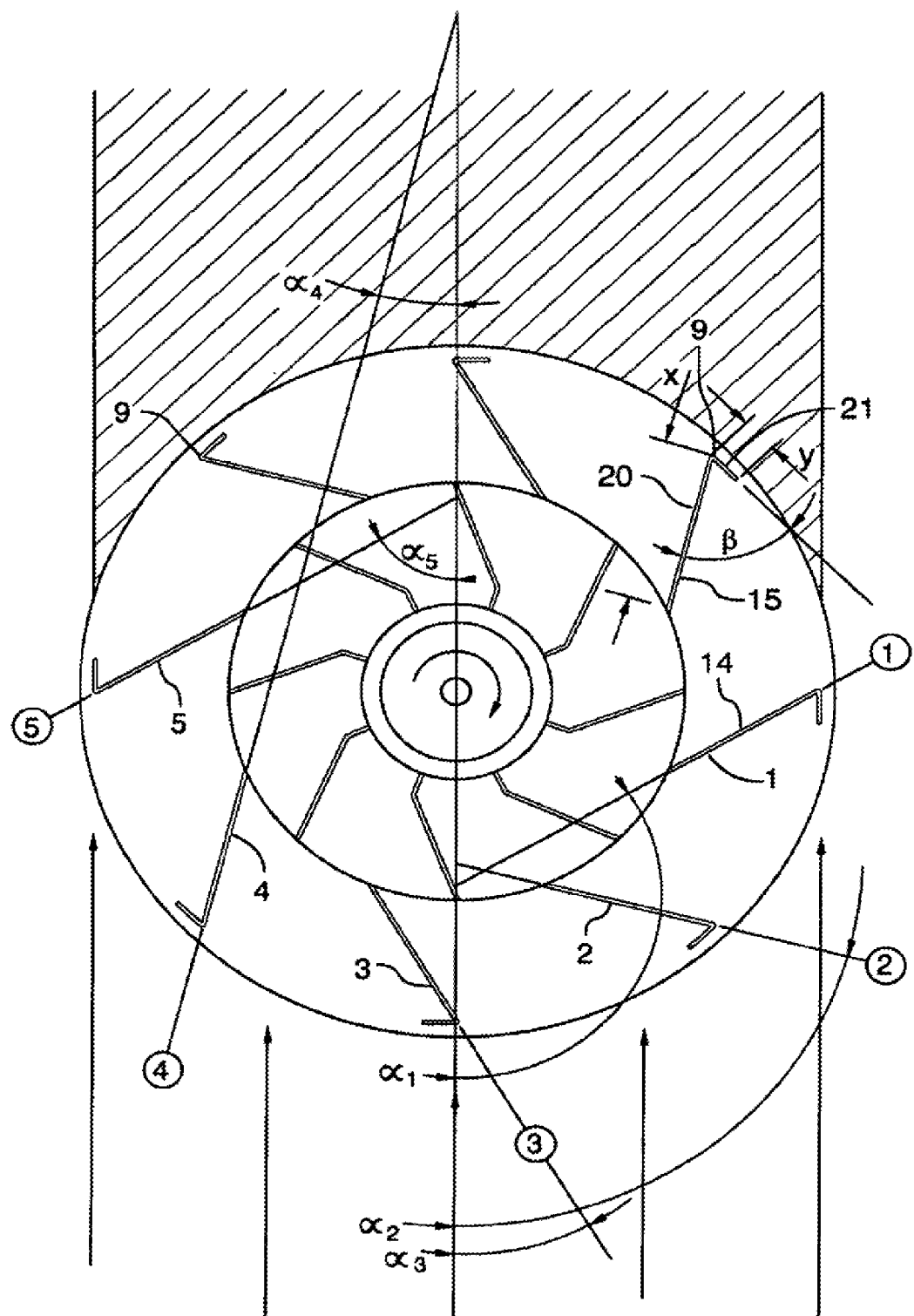
Figure 3:
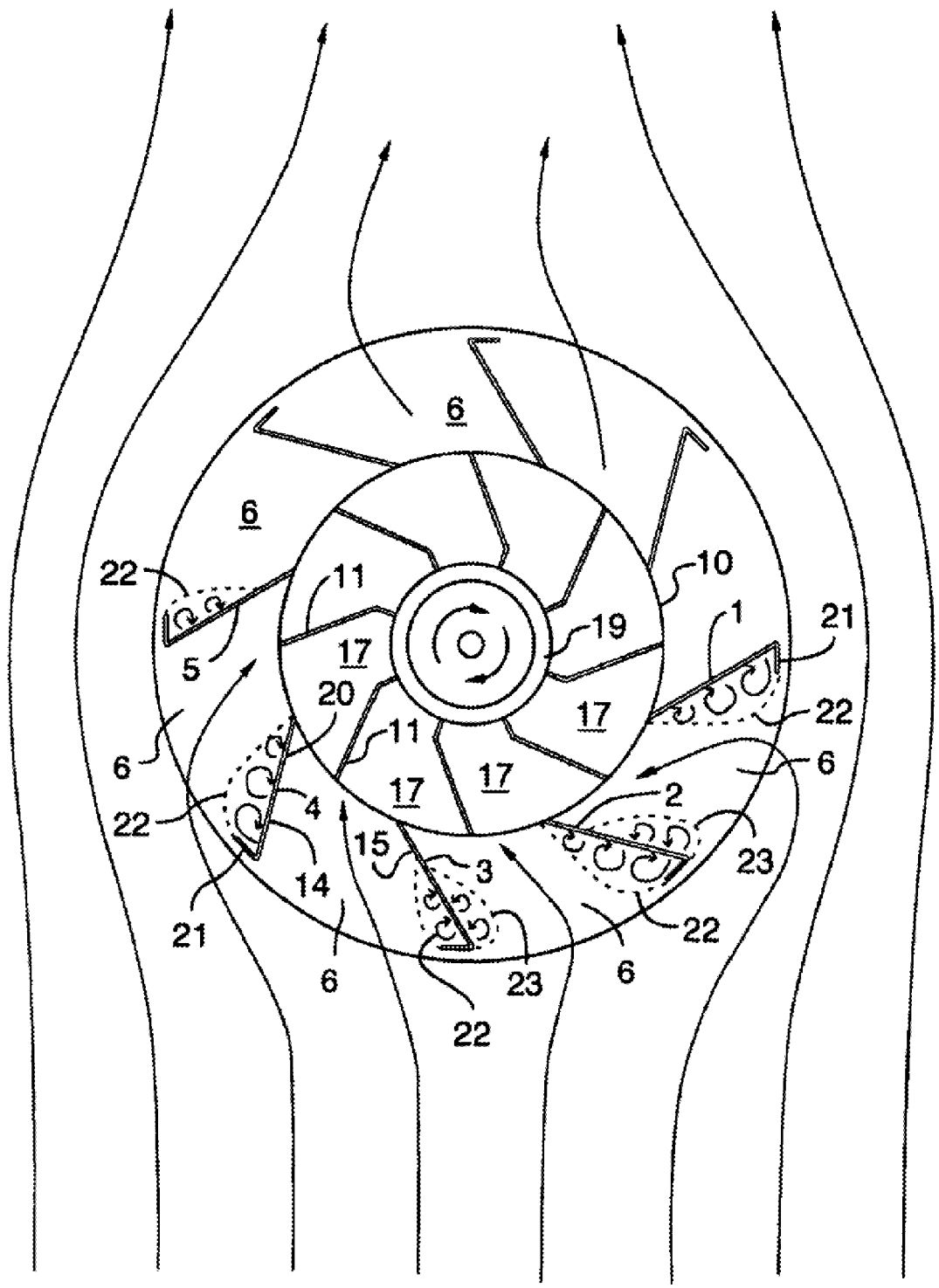
Figure 5:
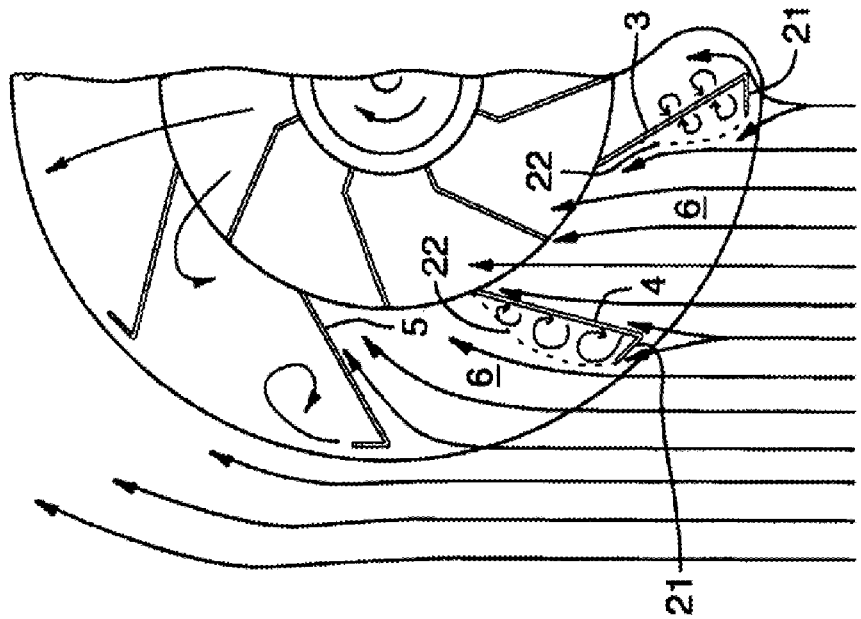
Figure 4:
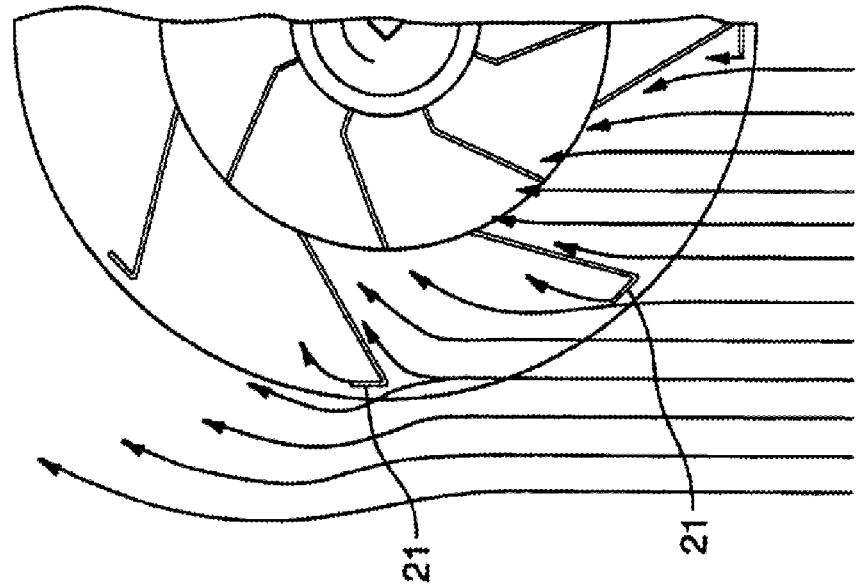
Figure 7:
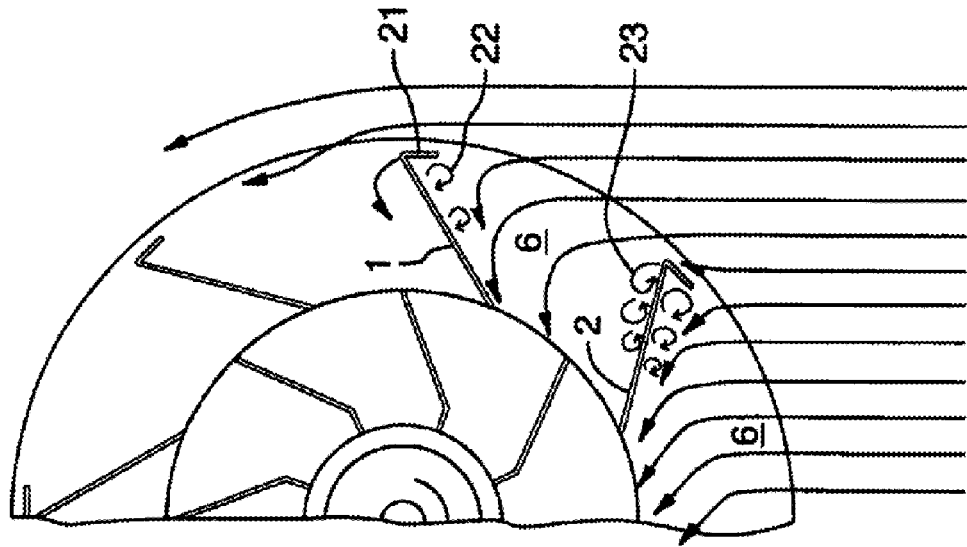
Figure 6:
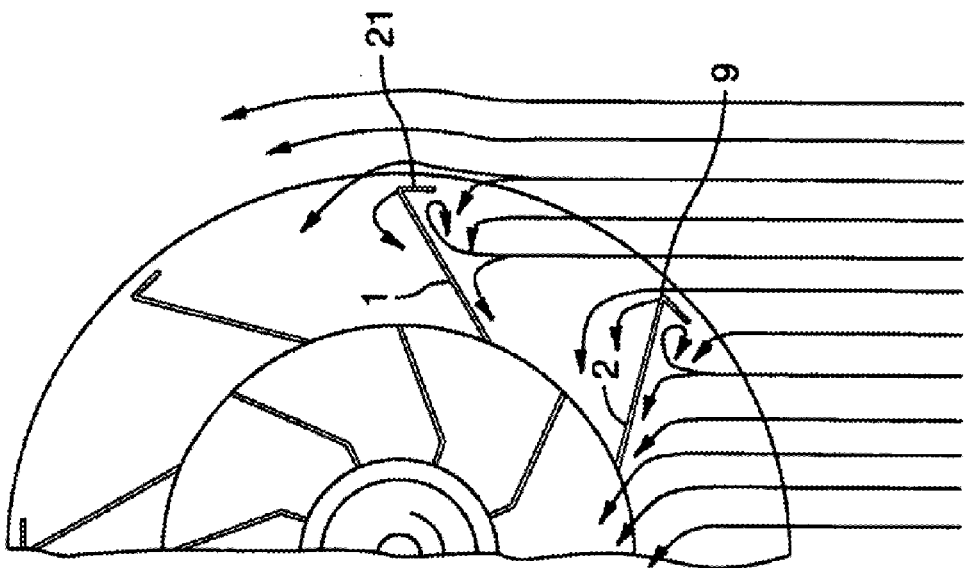
Figure 8:
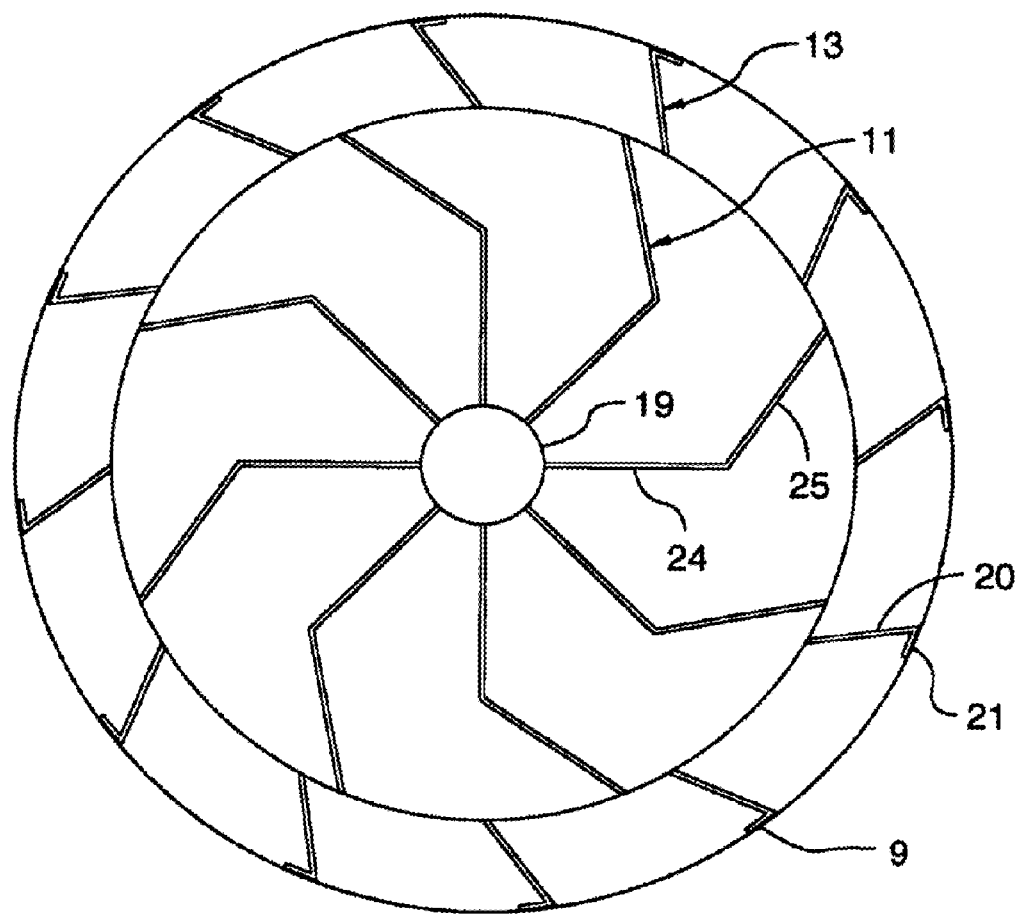
Figure 9:
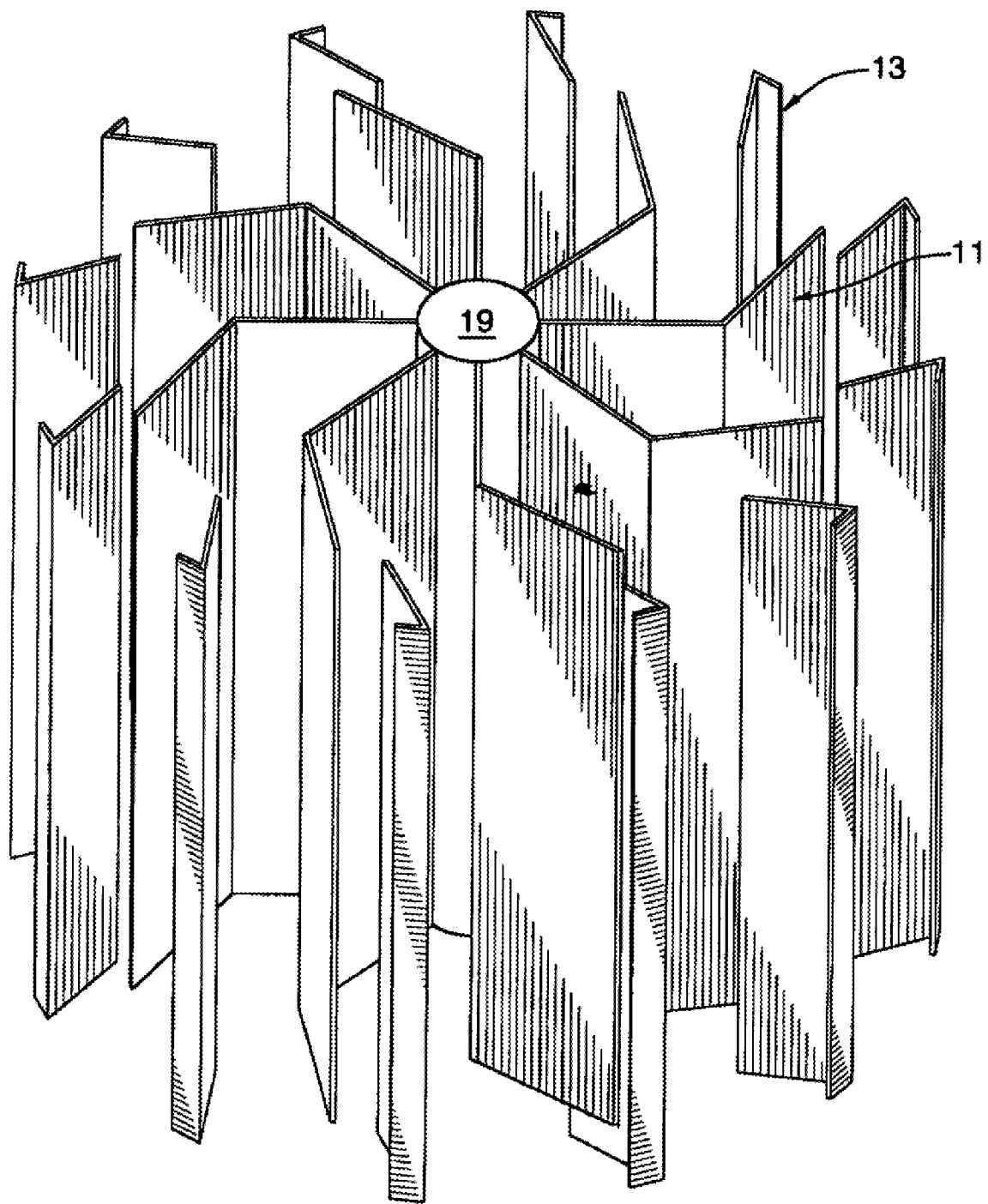

Turning to FIGS. 4 and 5, the creation of a downstream vacuum area is shown as wind current progresses over a sharp edge created by the flange 21. A swirling boundary surface area is created 22 in a downstream area. In FIG. 5, the flange 21 of vane 4 creates a counter-clockwise swirling turbulence in the boundary layer 22 which serves to draw and redirect air into the airflow channel 6 between vanes 4 and 5. The airflow channel 6, between stators 3 and 4 receives airflow in a more direct manner due to its orientation relative to the direction of wind. However, the flange 21 of stator vane 3 creates a boundary layer 22 as air flows over the flange 21.

Figure 7:
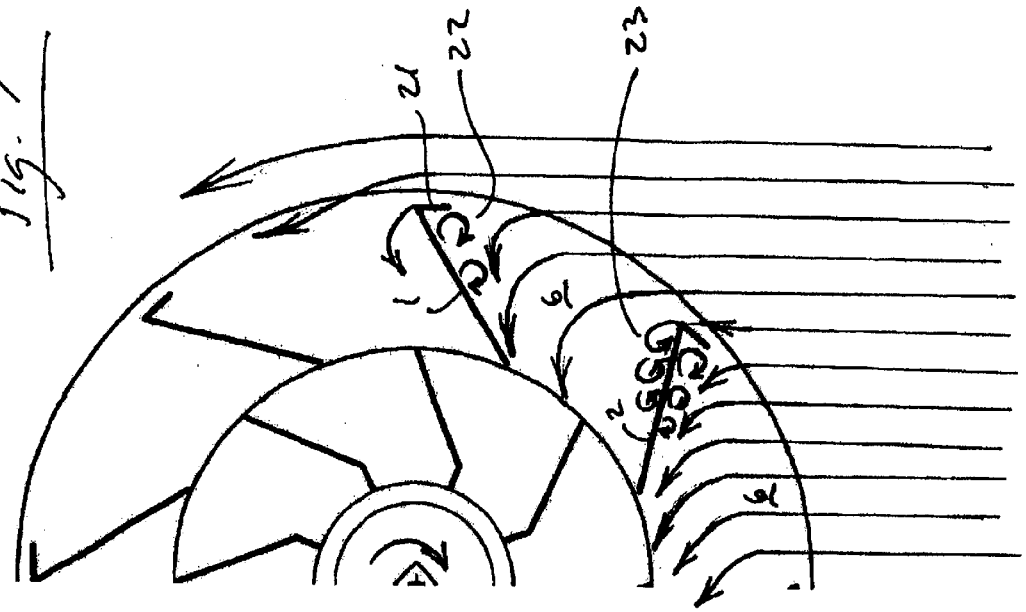
FIGS. 6 and 7 are progressive views of formation of turbulent air flow areas within the right side of the turbine.
Figure 6:
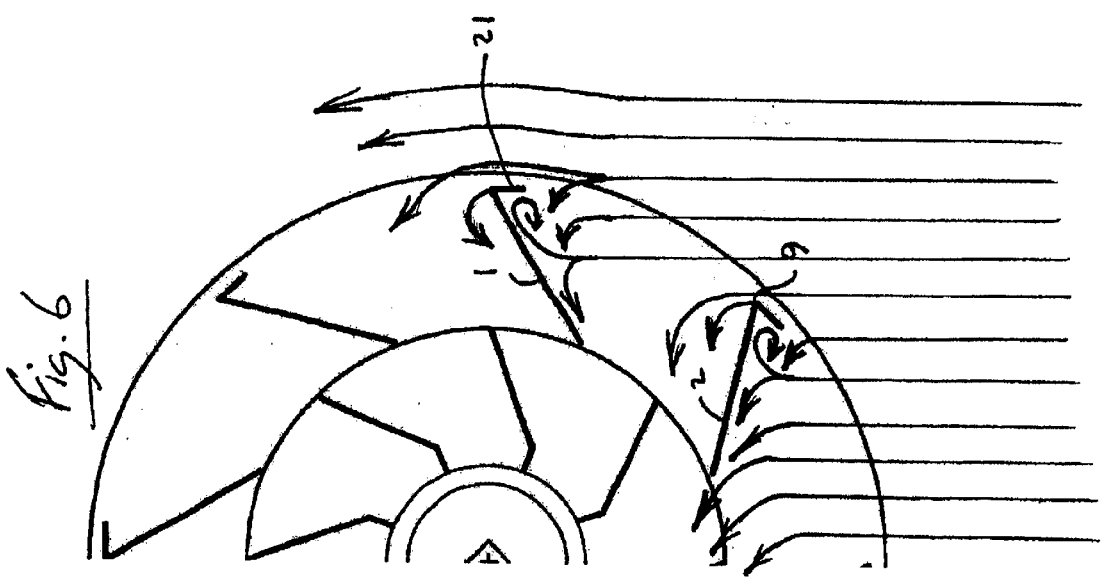
Figure 8:
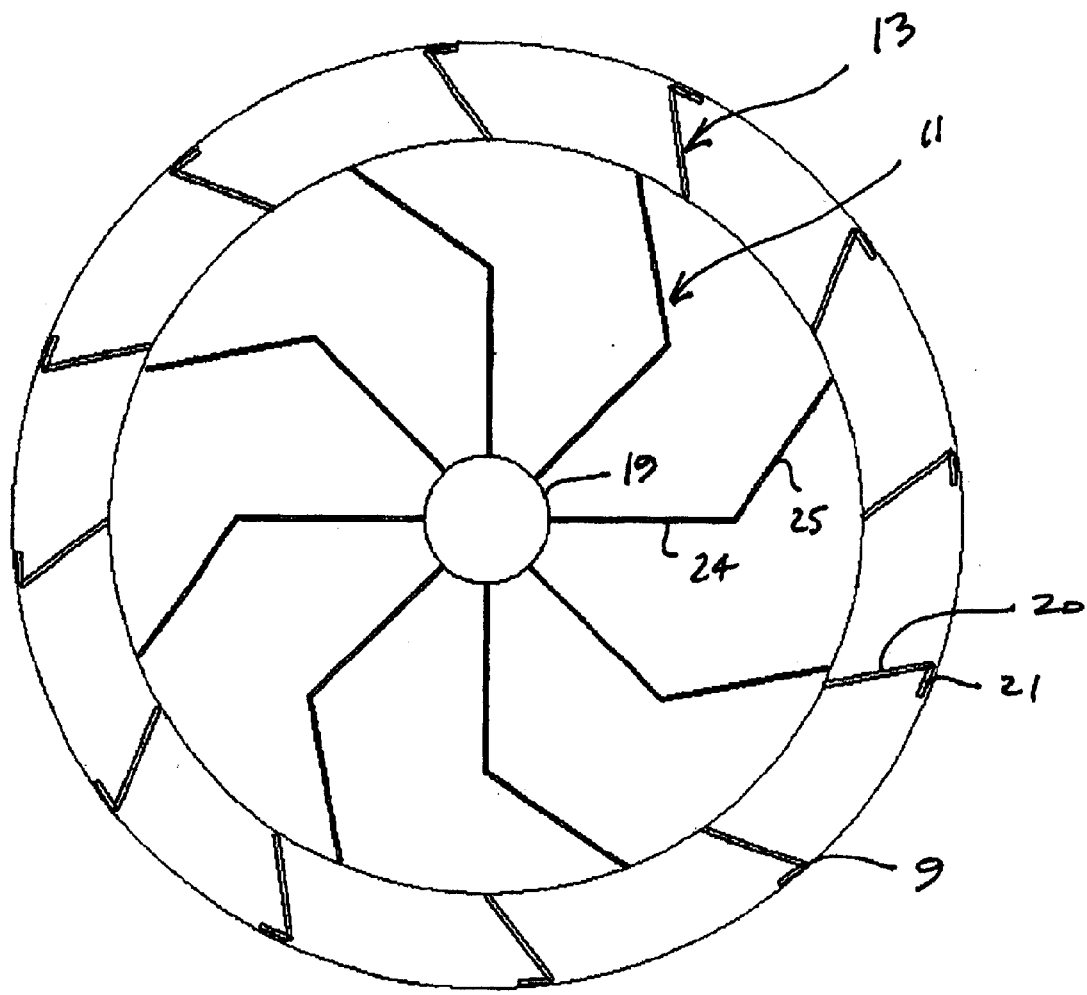
FIG. 8 is a horizontal sectional view through a second embodiment of the vertical axis wind turbine showing an example of the possible variation is relative proportions between stator vanes, rotor hub, and rotor blades.
Figure 9:
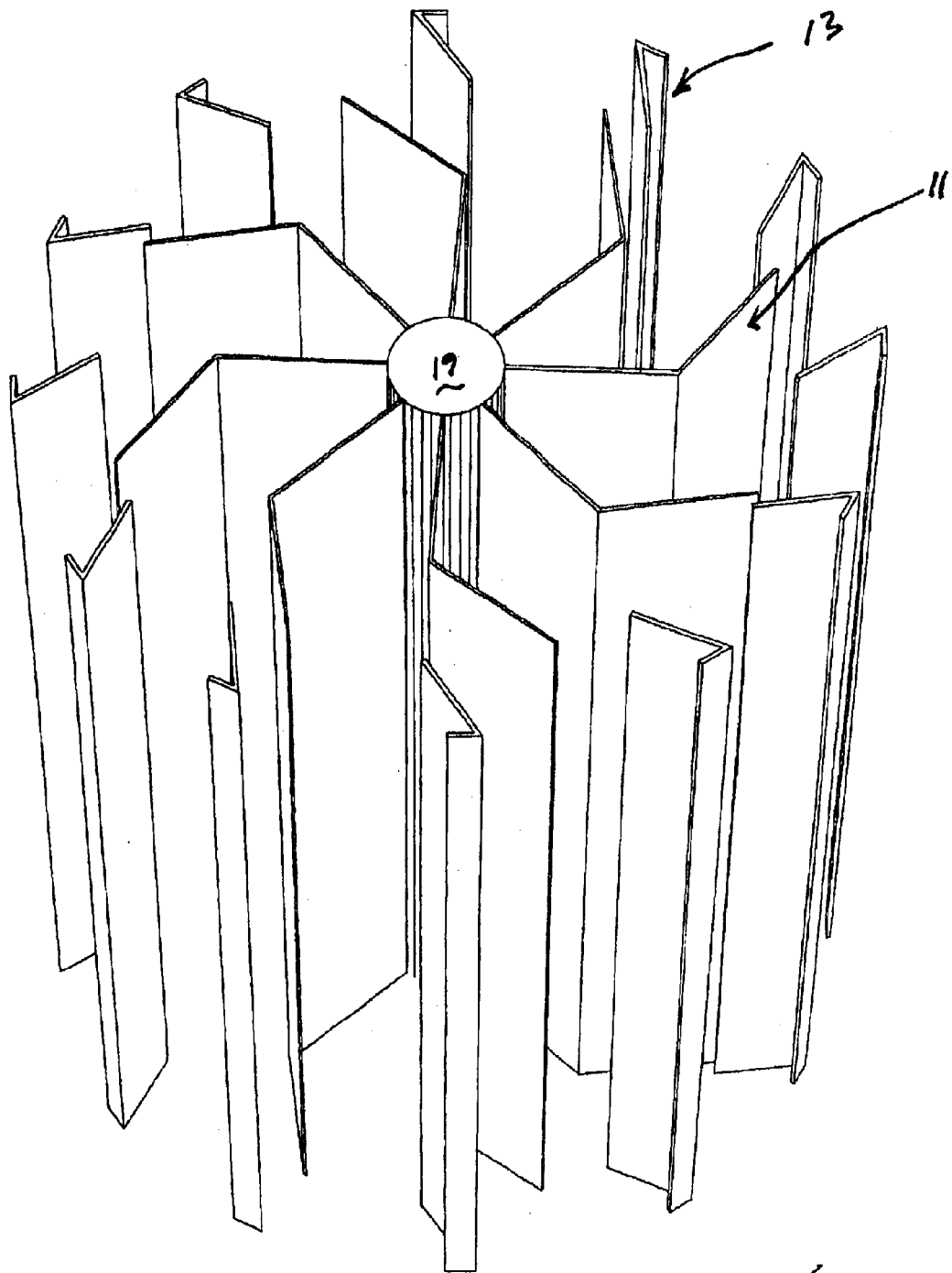
FIG. 9 is a perspective view of the second embodiment.
Figure 1:
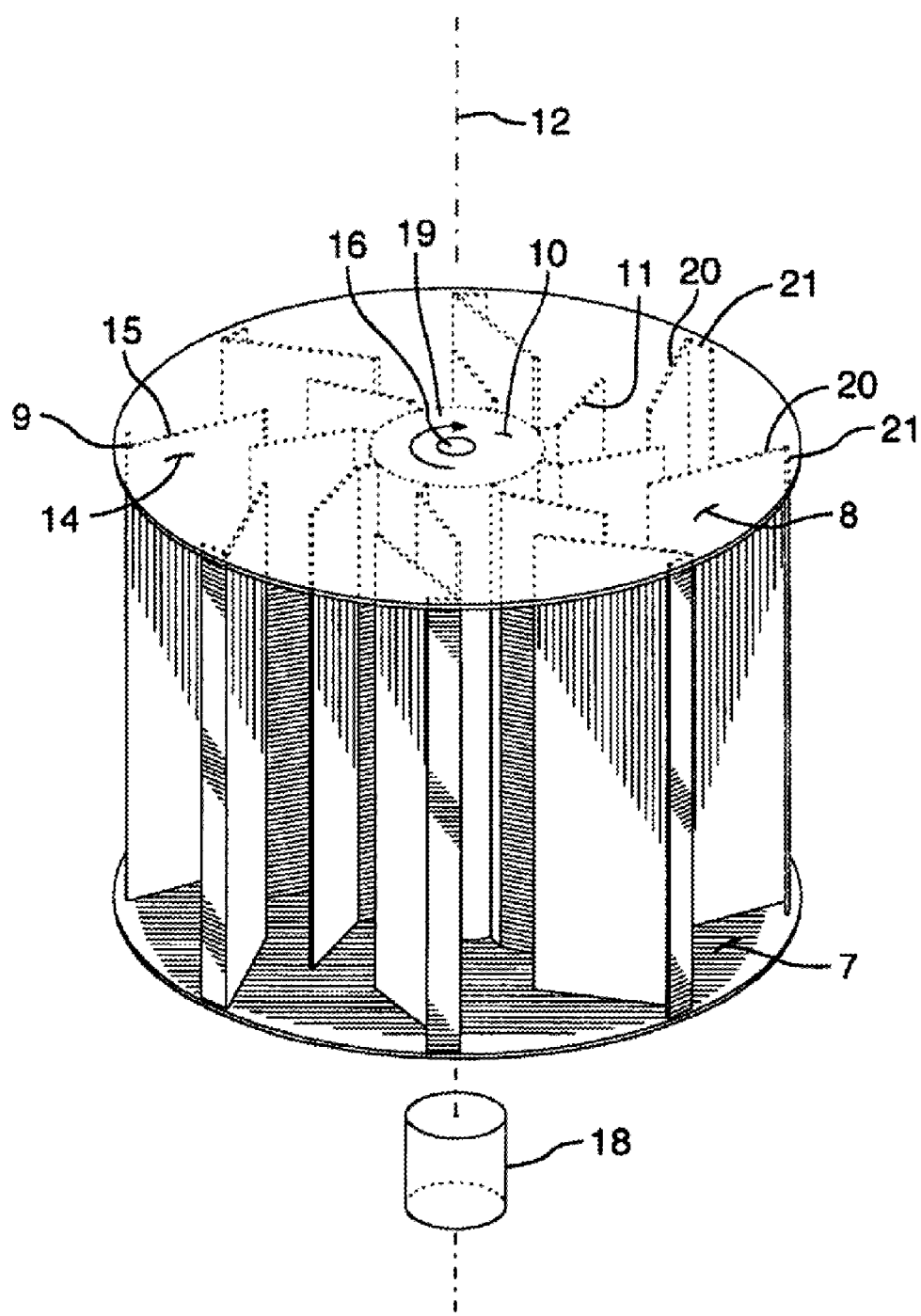
Figure 2:
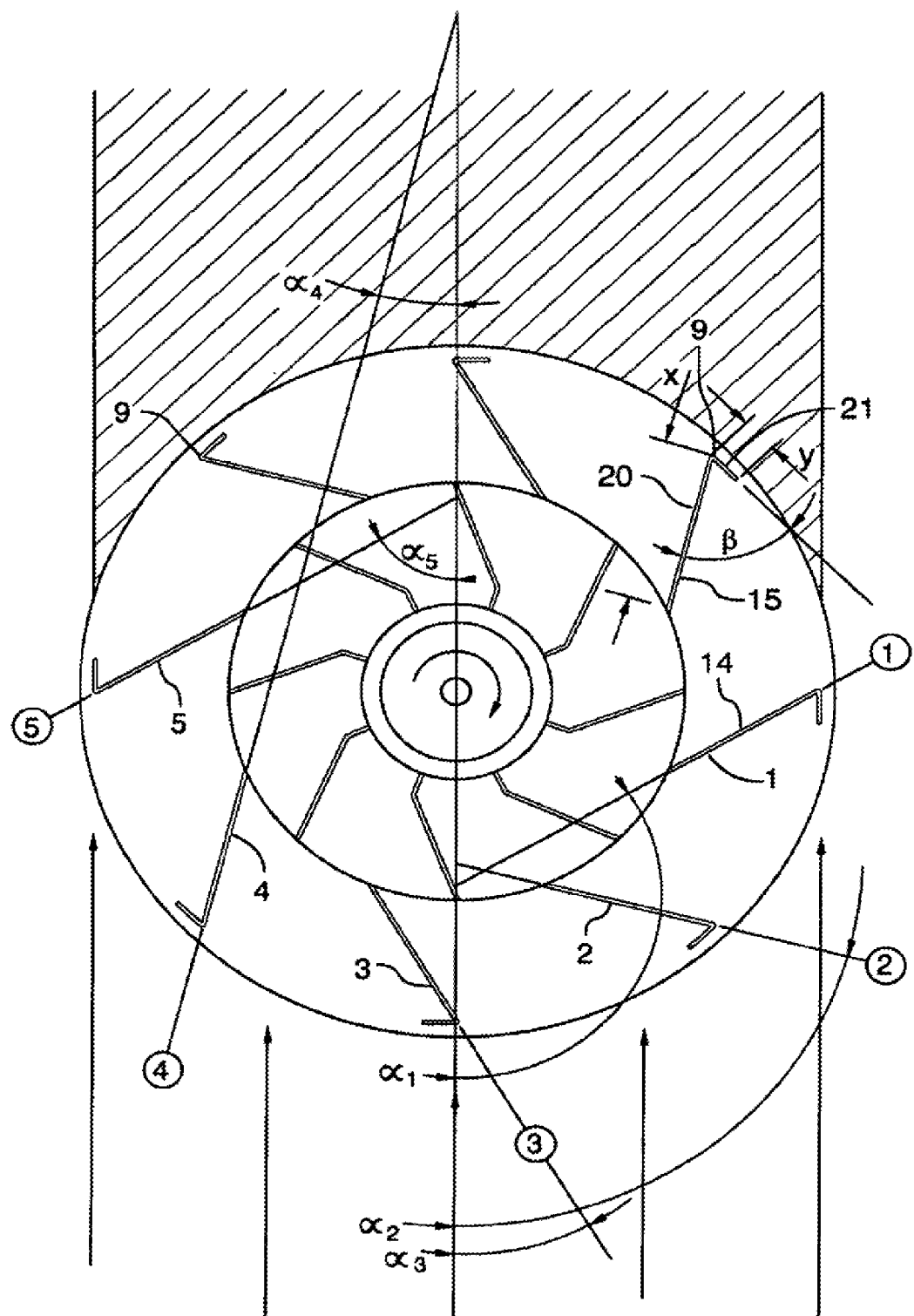

FIGS. 6 and 7 show the creation of boundary layers in the airflow channel 6 between vane 1 and vane 2. As shown in FIG. 6, wind flowing over the sharp edge 9 of vane 2 creates a counter clockwise swirling turbulent area 23. It is well known that fluid flowed over a sharp edge creates a vacuum on the downstream side which tends to urge fluid flow into a curved path as indicated by arrows in the drawing.

Impact of airflow against the outward facing surfaces of vane 1 splits the air flow into a left and right direction along the vane surface as drawn. The airflow towards the left progresses along the surface of the vane 1 in the direction of the rotor. However, the split portion of airflow towards the right encounters the flange 21 and is redirected back in a clockwise direction to encounter the incoming flow of air from the wind direction. As indicated in FIG. 7 however, the turbulence created results in a swirling clockwise flow in a boundary layer area 22 which serves to redirect and draw air into the airflow channel 6 between vanes 1 and 2.

Therefore it can be seen that absence of the flange 21 in the circumstances shown in FIGS. 6 and 7 will simply result in airflow passing over the outward facing surface of the vane 1. However, provision of the flange 21 redirects airflow across the surface of vane into a clockwise rotation turbulent boundary layer 22. The boundary layer 22 together with boundary layer 23 draw and redirect airflow such that a greater area of catchment for wind is provided by the semi-cylindrical surface of the stator vane assembly. Testing shows that blocking all other airflow channels 6 except the channel 6 between vanes 1 and 2 still results in clockwise rotation of the rotor 10 when airflow is maintained in the direction indicated.

Through experimentation it has been estimated that the optimal number of stator vanes 13 is 6–12 and the number of rotor blades 11 is 5–8, in order to avoid excessive shielding of the wind and complexity of construction. Rotor blades 11 also preferably have a simple two part structure with the inner blade portion 24 in a radial plane extending from the axis 12 and the outer blade portion 25 disposed at an obtuse angle or at a simple right angle to the inner blade portion 24.

Although the above description relates to a specific preferred embodiment as presently contemplated by the inventor, it will be understood that the invention in its broad aspect includes mechanical and functional equivalents of the elements described herein.

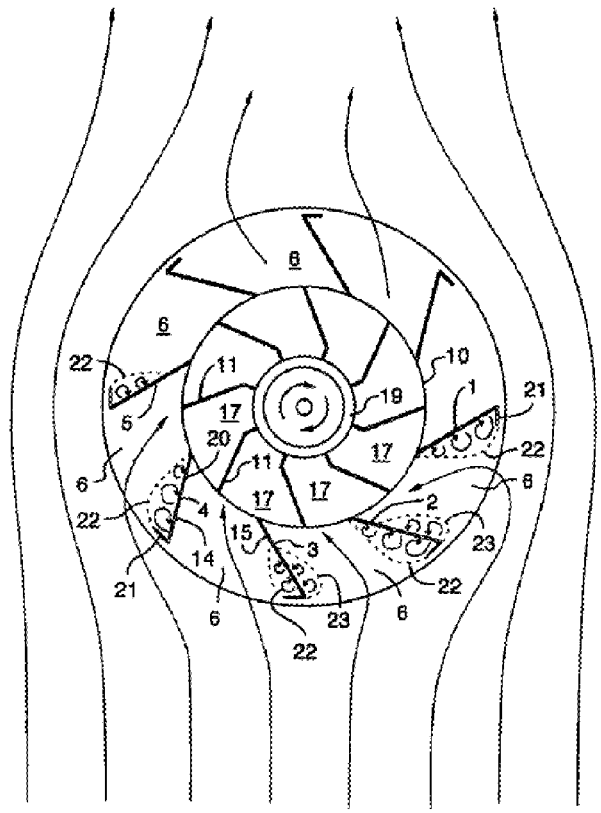

I claim:

1. A vertical axis wind turbine comprising:
    a turbine rotor with rotor blades disposed for rotation about a substantially vertical axis;
    a plurality of vertically extending stator vanes circumferentially spaced apart about the rotor in an annular array, each vane having: a radially inward facing surface: a radially outward facing surface and a flange on an outer edge of each vane.

2. A vertical axis wind turbine according to claim 1 wherein the flange is disposed at an acute angle to the outward facing surface of the vane.

3. A vertical axis wind turbine according to claim 1 wherein the flange is tangential to a circle circumscribed by points in a horizontal plane intersecting the outer edges of the vanes.

4. A vertical axis wind turbine according to claim 1 wherein the vane has a horizontal width relative to a horizontal width of the flange in the ratio of 4:1 to 6:1.

5. A vertical axis wind turbine according to claim 1 wherein each vane and flange has a uniform horizontal cross-section throughout their vertical length.

6. A vertical axis wind turbine according to claim 1 wherein inward and outward facing surfaces of the vanes and flanges are planar.

7. A vertical axis wind turbine according to claim 5 wherein inward and outward facing surfaces of the vanes and flanges are parallel.

8. A vertical axis wind turbine according to claim 1 wherein the vanes extend vertically between a top and a bottom plate defining a plurality of air flow channels bounded by the inward facing surface of a first vane and the outward facing surface of a second vane adjacent the first vane.

9. A vertical axis wind turbine according to claim 8 wherein the top and bottom plates include rotor shaft mounting bearings.

10. A vertical axis wind turbine according to claim 1 wherein the rotor blades have an inner edge abutting a rotor hub thereby defining a plurality of air containment chambers.

11. A vertical axis wind turbine according to claim 1 wherein the rotor blades have a uniform horizontal cross-section throughout their vertical length.

12. A vertical axis wind turbine according to claim 1 wherein the rotor blades have planar vertical surfaces.

13. A vertical axis wind turbine according to claim 1 wherein the rotor blades have helical surfaces.

14. A vertical axis wind turbine according to claim 1 wherein the rotor shaft includes an electrical generator.

* * * * *

UNITED STATES PATENT AND TRADEMARK OFFICE
CERTIFICATE OF CORRECTION

PATENT NO. : 6,740,989 B2
APPLICATION NO. : 10/224463
DATED : May 25, 2004
INVENTOR(S) : John Rowe It is certified that error appears in the above-identified patent and that said Letters Patent is hereby corrected as shown below:

Figures 1-9 are replaced with formal drawings attached showing identical subject matter.

Signed and Sealed this

Twenty-fifth Day of March, 2008

JON W. DUDAS
*Director of the United States Patent and Trademark Office*

UNITED STATES PATENT AND TRADEMARK OFFICE
CERTIFICATE OF CORRECTION

PATENT NO. : 6,740,989 B2
APPLICATION NO. : 10/224463
DATED : May 25, 2004
INVENTOR(S) : John Rowe It is certified that error appears in the above-identified patent and that said Letters Patent is hereby corrected as shown below:

Delete the title page and substitute therefor the attached title page.

Figures 1-9 are replaced with formal drawings attached showing identical subject matter.

This certificate supersedes the Certificate of Correction issued March 25, 2008.

Signed and Sealed this

Twenty Second Day of April, 2008

JON W. DUDAS
*Director of the United States Patent and Trademark Office*

(12) United States Patent
Rowe

(10) Patent No.: US 6,740,989 B2
(45) Date of Patent: May 25, 2004

(54) VERTICAL AXIS WIND TURBINE

(75) Inventor: John Rowe, Whitby (CA)

(73) Assignee: Pacifex Management Inc., Ontario (CA)

(*) Notice: Subject to any disclaimer, the term of this patent is extended or adjusted under 35 U.S.C. 154(b) by 86 days.

(21) Appl. No.: 10/224,463

(22) Filed: Aug. 21, 2002

(65) Prior Publication Data
US 2004/0036297 A1 Feb. 26, 2004

(51) Int. Cl.$^7$ ............................................. F03D 3/04
(52) U.S. Cl. .................... 290/55; 290/44; 415/4.2; 415/4.4
(58) Field of Search ...................... 290/43, 44, 54, 290/55; 415/4.2, 4.4

(56) References Cited

U.S. PATENT DOCUMENTS

| | | | |
|---|---|---|---|
| 1,578,835 A | 3/1926 | Kothe | |
| 4,039,849 A | * 8/1977 | Mater et al. | 290/55 |
| 4,551,631 A | * 11/1985 | Trigilio | 290/55 |
| 4,684,817 A | 8/1987 | Goldwater | |
| 4,686,376 A | * 8/1987 | Retz | 290/42 |
| 5,044,878 A | 9/1991 | Wilhelm | |
| 5,336,933 A | 8/1994 | Ernster | |
| 5,391,926 A | 2/1995 | Staley et al. | |
| 5,664,418 A | * 9/1997 | Walters | 60/398 |
| 5,852,331 A | 12/1998 | Giorgini | |
| 6,015,258 A | 1/2000 | Taylor | |
| 6,109,863 A | 8/2000 | Milliken | |
| 6,191,496 B1 | * 2/2001 | Elder | 290/55 |
| 6,465,899 B2 | * 10/2002 | Roberts | 290/44 |
| 2002/0047276 A1 | 4/2002 | Elder | |

* cited by examiner

Primary Examiner—Nicholas Ponomarenko
(74) Attorney, Agent, or Firm—Ogilvy Renault; Paul J. Field

(57) ABSTRACT

A vertical axis wind turbine with a turbine rotor with rotor blades disposed for rotation about a substantially vertical axis. The turbine includes multiple vertically extending stator vanes circumferentially spaced apart about the rotor in an annular array. Each vane has a radially inward facing surface, a radially outward facing surface and a flange on an outer edge of each vane. The flange serves to create a turbulent swirling boundary layer on the vane surfaces that rotates in a direction that draws and redirects air flow into the air flow channels defined by the stator vanes that is then compressed by the narrowing of the channels and directed to the rotor blades to drive the turbine.

14 Claims, 7 Drawing Sheets